No. 837,787.
PATENTED DEC. 4, 1906.
J. M. BRASINGTON.
FERTILIZER DISTRIBUTER.
APPLICATION FILED MAR. 23, 1906.
2 SHEETS—SHEET 1.
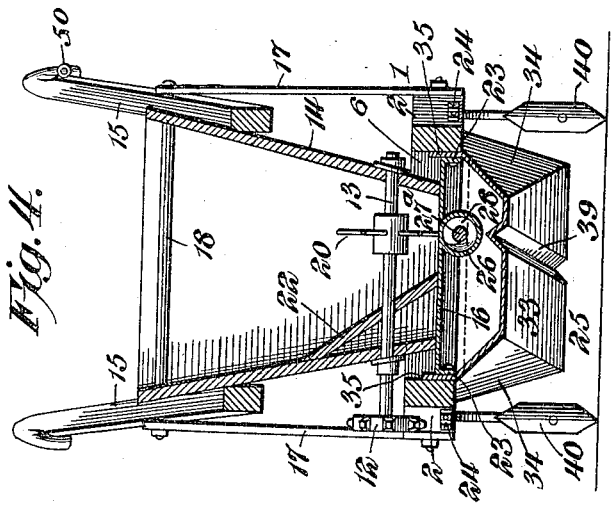
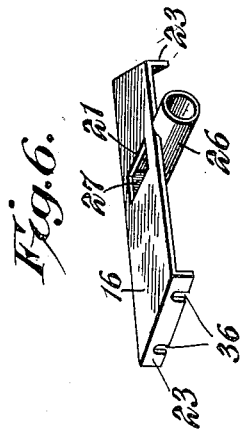
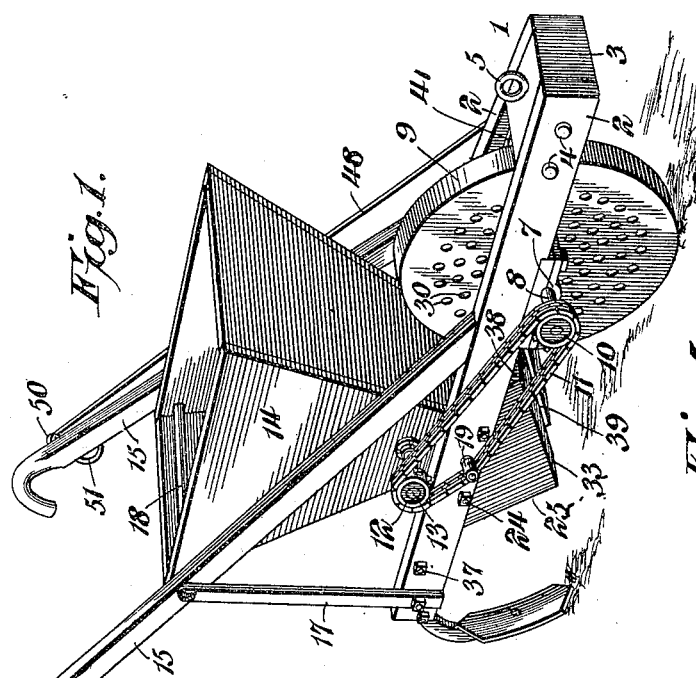
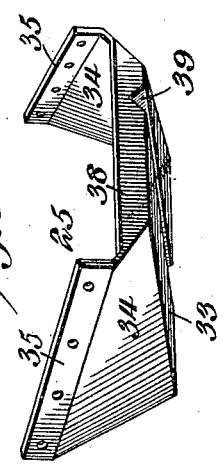
John M. Brasington, Inventor,
Witnesses
Howard D. Orr.
T. F. Riley.
By E. G. Siggers.
Attorney

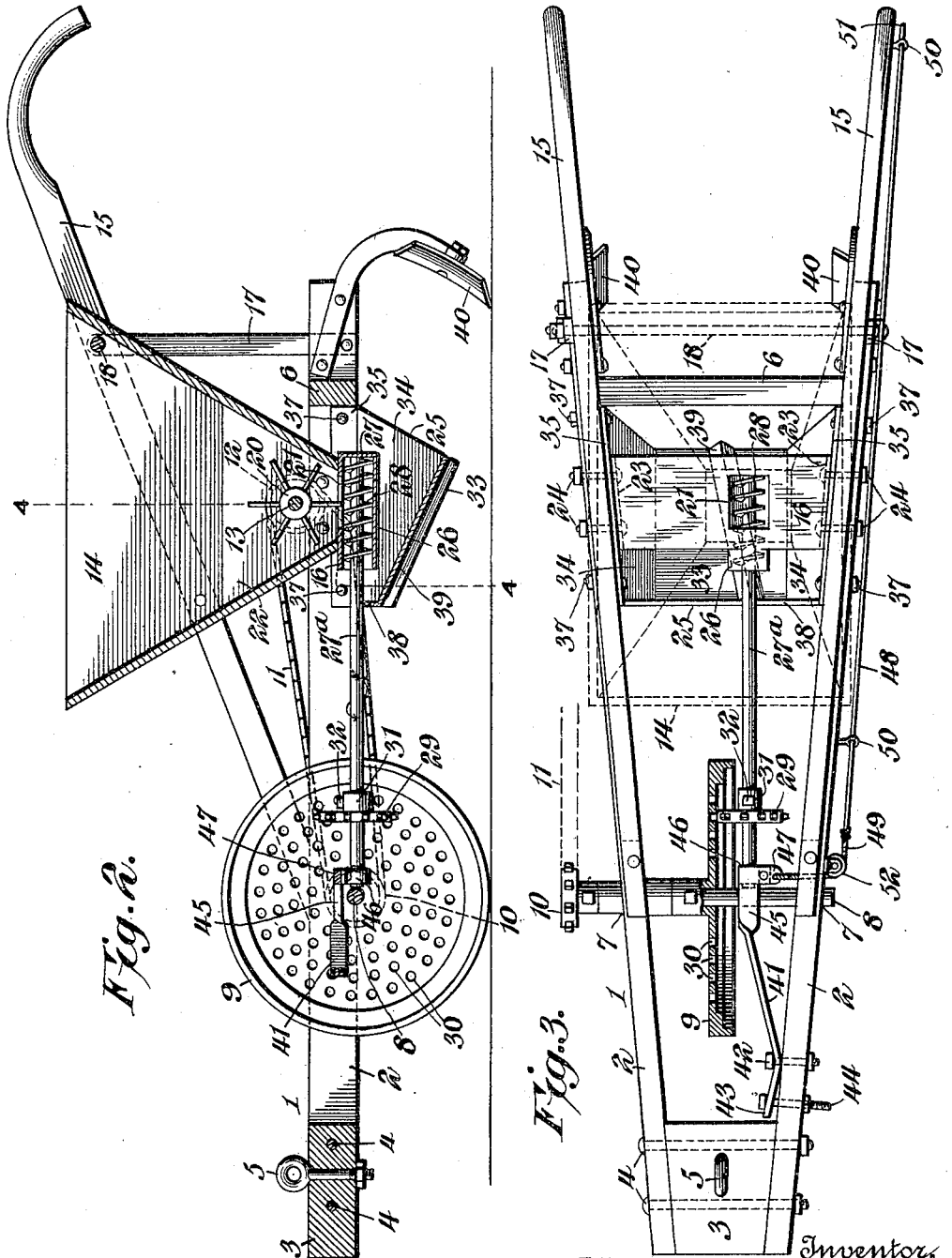

UNITED STATES PATENT OFFICE.

JOHN M. BRASINGTON, OF BENNETTSVILLE, SOUTH CAROLINA, ASSIGNOR TO T. E. AND C. S. McCALL, JR., OF BENNETTSVILLE, SOUTH CAROLINA.

FERTILIZER-DISTRIBUTER.

No. 837,787.  Specification of Letters Patent.  Patented Dec. 4, 1906.

Application filed March 23, 1906. Serial No. 307,680.

*To all whom it may concern:*

Be it known that I, JOHN M. BRASINGTON, a citizen of the United States, residing at Bennettsville, in the county of Marlboro and State of South Carolina, have invented a new and useful Fertilizer-Distributer, of which the following is a specification.

The invention relates to improvements in fertilizer-distributers.

The object of the present invention is to improve the construction of fertilizer-distributers and to provide a simple, inexpensive, and efficient one designed particularly for distributing guano in the cultivation of cotton and adapted to discharge the fertilizer in two broad streams at each side of the center of the furrow in which the cotton-seed is planted, whereby the soil is fertilized without liability of the guano coming in contact with and injuring the young cotton-plants as they sprout from the soil.

A further object of the invention is to provide a fertilizer-distributer of this character having means for preventing light fertilizer from being blown from the row operated on.

Another object of the invention is to provide means for positively feeding the fertilizer to the distributing means and to enable the feed to be readily controlled for causing the desired quantity of fertilizer to be discharged over a given area.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a fertilizer-distributer constructed in accordance with this invention. Fig. 2 is a longitudinal sectional view of the same. Fig. 3 is a plan view, partly in section, the hopper being removed. Fig. 4 is a transverse sectional view taken substantially on the line 4 4 of Fig. 2. Fig. 5 is a detail perspective view of the distributing-shoe. Fig. 6 is a detail perspective view of the plate which constitutes the bottom of the hopper.

Like numerals of reference designate corresponding parts in all the figures of the drawings.

1 designates a frame provided with side bars 2, converging forwardly and having their front ends spaced apart by a tapering block 3 and secured to the same by transverse rods or bolts 4. The block or piece 3 is provided with a suitable clevis 5, and the rear portions of the side bars are connected by a transverse bar 6, interposed between the side bars and suitably secured to the same.

The side bars are provided at intermediate points with suitable bearings 7, located at the lower edges of the said bars 2 and receiving a transverse shaft or axle 8, on which is mounted a ground or carrying wheel 9.

The shaft or axle 8 is extended at one end beyond the frame of the machine and has a sprocket-wheel 10 keyed or otherwise secured to it. This sprocket-wheel 10 is connected by a sprocket-chain 11 with a sprocket-wheel 12, which is mounted on one end of an agitator-shaft 13, journaled in suitable bearings at opposite sides of a hopper 14. The hopper 14, which is located in rear of the wheel 9, is arranged between a pair of inclined handle-bars 15 and is mounted upon a bottom plate 16, which is suitably connected with the frame of the machine at the inner faces of the side bars 2. The handle-bars are supported by rear braces 17, secured at their lower ends to the outer faces of the rear ends of the side bars, and connected at their upper ends to the handle-bars by a transverse rod 18, which also pierces the sides of the hopper and extends across the same, as clearly shown in Figs. 1 and 4 of the drawings.

The sprocket-chain 11 is maintained at the desired tension by an antifriction sleeve or roller 19, which is mounted on a suitable bolt and which engages the lower stretch of the sprocket-chain at the upper face thereof. The shaft 13 carries a rotary agitator 20, consisting of a hub and a plurality of radially-arranged arms extending from the hub and adapted to work the fertilizer through a discharge-opening 21 of the bottom plate 16. The agitator 20 is located directly above the discharge-opening, and the hopper is preferably provided with an inclined guide 22 for drawing the fertilizer toward the agitator and the discharge-opening 21, which are located at one side of the center of the machine. The hopper, however, may be of any other preferred construction to secure this result.

The bottom plate 16, which extends across the frame of the machine, is provided at opposite sides with depending attachment-flanges 23, which are secured to the side bars of the frame by means of bolts 24 or other suitable fastening devices, and the said bolts 24 also pierce the sides of a fertilizer-distributing shoe 25. The said bottom plate 16 is also provided with a tubular casing 26, which is closed at its rear end 27 and which is cut away at the top at the discharge-opening 21 to permit the guano or other fertilizer to fall into it. The front end of the tubular casing is open for discharging the fertilizer upon the distributing-shoe, and a positive feed of the fertilizer is effected by means of a spiral conveyer 28, arranged within the casing 26 and mounted on a longitudinal shaft 27. The tubular casing forms a socket or bearing for the rear portion of the shaft, the spiral conveyer being adapted to turn loosely in the same and sufficient play being provided to admit of a limited lateral movement of the shaft to carry a pinion or gear 29 into and out of engagement with the ground or carrying wheel.

The ground or carrying wheel operates as a drive-wheel and is dished to receive the pinion or gear 29, which is adjustably mounted on the front portion of the shaft 27 for enabling it to mesh with different sets of perforations 30 of the carrying or ground wheel. The gear or pinion 29 is provided with an extended hub 31 and is secured in its adjustment by a clamping-screw 32, which pierces the hub 31 and engages the shaft 27. The perforations 30 are arranged in sets or series which are concentric and which are located at different distances from the center of the ground or carrying wheel, whereby the speed of the longitudinal shaft may be changed by moving the gear or pinion 29 toward or from the center of the wheel 9. By means of this adjustment the desired amount of fertilizer may be distributed over any given area. The wheel 9 is provided with a peripheral flange or portion extending from one side of the wheel and forming a broad tread. By dishing the wheel 9 in this manner and extending the pinion or gear 29 into the same the longitudinal shaft and the feed mechanism operated by the same are brought comparatively close to the median line of the machine.

The distributing-shoe is provided with an inclined bottom 33, and it has downwardly and inwardly inclined sides 34, which are provided at their upper edges with attachment flanges or portions 35. The attachment flanges or portions 35, which are vertical, are arranged against the inner faces of the side bars, being interposed between the same and the attachment-flanges 23 of the bottom plate 16.

The attachment-flanges 23 are provided with recesses 36, extending upward from the lower edges of the same to enable the bottom plate to fit over the bolts 24, and when the bolts are loosened the said bottom plate may be readily removed. The flanges or portions 34 are also secured to the side bars 2 of the frame of the machine by suitable fastening devices 37, located in rear of the bolts. The bottom is tapered upwardly and gradually increases in width from the top to the bottom to support the fertilizer. The inclined sides are also tapered, as shown, and they are adapted to protect the fertilizer and prevent the same from being blown from the bottom of the shoe, and they insure the delivery of the fertilizer at opposite sides of the row operated on. The fertilizer is discharged from the tubular casing onto the bottom of the shoe at the upper portion thereof, an upper transverse end wall 38 being provided. This wall extends entirely across the upper small end of the shoe, as clearly shown in Fig. 5.

In order to discharge the fertilizer at opposite sides of the center of the row and at the same time prevent the fertilizer from falling directly upon the center, the bottom 33 is provided with an angularly-disposed ridge 39, formed by grooving or upsetting the bottom of the shoe at the lower face thereof and extending from the front end of the shoe to the rear end thereof. The ridge or rib 39 is inverted-V-shaped in cross-section and provides oppositely-inclined sides for distributing the fertilizer to opposite sides of it. The upper or front end of the rib or ridge 39 is located to one side of the median line and at a point directly beneath the front or discharge end of the tubular casing, and the lower end of the said rib or ridge is arranged centrally of the rear edge of the bottom. By this arrangement the fertilizer is evenly divided at one side of the center of the machine and is uniformly distributed and discharged at opposite sides of the center of the rear end of the shoe, and the said rib or ridge is of sufficient width to prevent the fertilizer from falling directly upon the center of the row, as it is desirable to prevent the young plants from coming directly in contact and being injuriously affected by the fertilizer.

The fertilizer-distributer is provided at the rear ends of the side bars of the frame with suitable cultivator blades or shovels 40, which may be of any preferred construction.

The gear of the longitudinal shaft is maintained positively in mesh with the wheel 9 by means of a tension device consisting of a spring 41, which is bent between its ends to form front and rear angularly-disposed arms. The spring 41 is fulcrumed at its angle or bend on the inner face of one of the side bars of the frame by means of a bolt 42, and the front arm 43, which is shorter than the rear arm of the spring 41, is engaged by an adjusting device, which preferably consists of a bolt 44. The bolt 44 pierces the front arm 43 of the spring and also passes through the adjacent side bar of the frame and is provided at its outer end with an adjusting-nut. By drawing the short arm 43 toward the adjacent side bar the rear end of the spring is forced in the direction of the wheel 9, and the desired tension may be placed on the spring, as will be readily understood. The rear portion 45 of the spring is given a quarter-bend to arrange it horizontally, the body portion of the spring being arranged vertically edgewise, as shown. The horizontally-disposed rear portion 45 carries a bearing 46, which receives the front end of the shaft 27ª and which is also provided with a laterally-projecting ear 47 for enabling suitable operating mechanism to be connected with the spring. The operating mechanism consists of an operating-rod 48 and a short flexible connection 49. The operating-rod extends longitudinally of one of the handle-bars and is supported by suitable guides 50. The rear end of the operating-rod is provided with a suitable grip or handle 51, and the short flexible connection 49, which is arranged on a guide-pulley 52, is secured at its outer end to the front terminal of the operating-rod. The inner end of the flexible connection is attached to the eye 47, and when the operating-rod is drawn rearward the rear arm of the spring will be swung outward to carry the gear 29 out of mesh with the wheel 9 to throw the machine out of operation. This construction enables the feed of the fertilizer to be cut off when desired by disengaging the gearing.

Having thus fully described my invention, what I claim as new, and desire to secure by Letters Patent, is—

1. In a machine of the class described, the combination with a hopper having a discharge-outlet at one side of the center, of a distributing-shoe having opposite sides and a connecting inclined bottom portion, said bottom portion being provided with a rib or ridge having oppositely-inclined sides for dividing the material, said rib or ridge extending along the bottom portion of the shoe from a point beneath the outlet to the median line of the shoe and arranged at an angle to the said median line.

2. In a machine of the class described, the combination with a hopper, feed mechanism embodying a laterally-movable shaft, gearing for rotating the shaft, said gearing having one of its members mounted on the said shaft, a spring having angularly-related arms and fulcrumed at the angle formed by the same, one of the arms of the spring supporting one end of the shaft and actuating the same to hold the said gearing in mesh, an adjusting device connected with the other arm of the spring for regulating the tension of the latter, and operating mechanism connected with the spring for throwing the gearing out of mesh.

In testimony that I claim the foregoing as my own I have hereto affixed my signature in the presence of two witnesses.

JOHN M. BRASINGTON.

Witnesses:
C. A. BROWN,
C. D. EASTERLING.